United States Patent [19]
Combs, III

[11] Patent Number: 5,020,268
[45] Date of Patent: Jun. 4, 1991

[54] AUTOMATIC LINE RELEASE WITH DEEP DIVING PLANER

[75] Inventor: Milton E. Combs, III, Ft. Lauderdale, Fla.

[73] Assignee: Milton E. Combs, Ft. Lauderdale, Fla.

[21] Appl. No.: 466,859

[22] Filed: Jan. 18, 1990

[51] Int. Cl.$^5$ ............................................. A01K 95/00
[52] U.S. Cl. .................................................. 43/43.13
[58] Field of Search ..................... 43/43.12, 43.13, 27.4

[56] References Cited

U.S. PATENT DOCUMENTS

| | | | |
|---|---|---|---|
| 2,039,120 | 4/1936 | Semar | 43/43.13 |
| 2,645,053 | 7/1953 | Moritz | 43/43.13 |
| 3,140,555 | 7/1964 | Gross | 43/43.13 |
| 3,835,573 | 9/1974 | Borchardt | 43/43.13 |
| 3,844,059 | 10/1974 | Weber | 43/43.13 |
| 3,863,382 | 2/1975 | Heili | 43/43.13 |
| 4,199,891 | 4/1980 | Davis | 43/43.13 |
| 4,411,090 | 10/1983 | Seals | 43/43.13 |
| 4,702,033 | 10/1987 | Shaw | 43/43.12 |

Primary Examiner—Kurt Rowan

[57] ABSTRACT

A deep trolling planer and fishing line release devise which is positioned above said planar and secured to the planar with a harness. Said release devise automatically frees a fishing line allowing a fish to be played unencumbered by additional machinery or devises. The planar may then be retrieved independent from said fishing line and reset for further fishing.

1 Claim, 3 Drawing Sheets

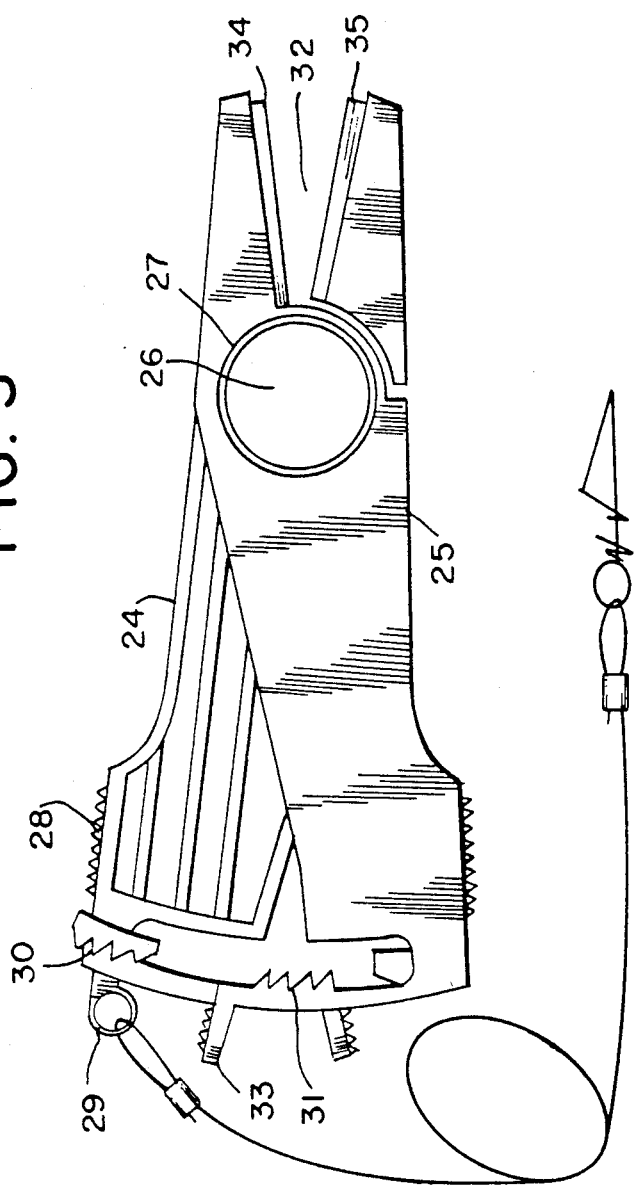

AUTOMATIC LINE RELEASE WITH DEEP DIVING PLANER

BACKGROUND-FIELD OF INVENTION

This invention relates to deep trolling planer devices with automatic fishing line releases, that allow an angler to retrieve a fish unencumbered by said planer.

BACKGROUND-DESCRIPTION OF PRIOR ART

A deep trolling device that allows an angler to play a fish without planer interference, achieves maximum depth possible for said device, assumes a proper downward angle when released into the water and requires only light duty fishing tackle would be preferred by most fishermen.

Heretofore a wide variety of trolling planers have been proposed for subsurface fishing. Typical planers are seen in the U.S. Patents of Staaden, U.S. Pat. No. 4,128,959; Davis, U.S. Pat. No. 4,199,891; Seals, U.S. Pat. No. 4,411,090; Neary, U.S. Pat. No. 4,129,956; and Even and Grude, U.S. Pat. No. 4,567,687.

Popular trolling planers typically utilize a forward weight, planning plate, wire bail and trip ring, with a bait attached to the trailing end of said planer. Planers are normally attached to a rod line between said rod and bait. The bail and ring encompass a mechanism for neutralizing the diving attitude of the plane when a fish strikes. This system produces interference for an angler while playing said fish, resulting in decreased sensation and increased line resistance.

This type of planning system produces a relatively shallow operating planer due to drag at the after edge of said planer, caused by a trailing bait, thus, reducing the planer angle and deep diving capability.

Another common problem with this system is initial planer positioning due to drag caused by a trailing bait. This drag often causes the trip ring to be pulled forward on the bail, causing said planer to slide along the surface rather than assume its intended downward angle.

Trolling planers produce a strong downward pull that requires heavier fishing tackle than would otherwise be required to retrieve a fish of similar size.

One trolling planer by Borchardt, U.S. Pat. No. 3,835,573 has an automatic line release system, however, this system attaches said line release device to the trailing edge of said planer, resulting in drag, reducing diving angle and producing difficulty in achieving initial planer dive angle. This device also utilizes a line release mechanism which, due to its metal construction, chafes the fishing line and does not hold said line in position while trolling at high speeds, 5 knots and above.

Another trolling planer has been proposed by Smith, U.S. Pat. No. 4,255,890. It is designed for use with down rigger cables and down rigger devices requiring additional equipment and expences.

Most users, therefore, would find it desirable to have a deep trolling fishing device which holds a fishing line securely in position without damage and at high speeds, releases said fishing line from said device when a fish strikes and requires no additional equipment beyond a planer and a light tackle fishing rod.

OBJECTS AND ADVANTAGES

Accordingly we claim the following as our objects and advantages of the invention: to provide a deep trolling planer device with a line release mechanism that allows an angler to play a fish unencumbered by said planer while keeping the planer submerged and out of the way.

In addition we claim a further object and advantage: to provide a planer which achieves maximum depth and dive angle by attaching a bait above the planning surface, rather than at the planer's trailing edge.

In addition we claim a further object and advantage: to provide a planer which assumes its proper diving attitude when released at the water's surface.

In addition we claim a further object and advantage: to provide a deep trolling planer which may utilize light tackle which increases the anglers sensation while fighting a fish, to eliminate the requirement for expensive and cumbersome heavy tackle or down rigger fishing equipment.

In addition we claim a further object and advantage: to provide an automatic line release mechanism which holds said line firmly in position while trolling at high speeds without causing line chafe, will not corrode and is resistant to the deleterious effects of salt water and sunshine.

Readers will find further objects and advantages of the invention from a consideration of the ensuing description and the accompanying drawings.

DRAWINGS FIGURES

FIG. 3 shows a side view of the line release mechanism.

DRAWING REFERENCE NUMERALS

| | |
|---|---|
| 1 boat | 19 plate |
| 2 rod | 20 weight |
| 3 cleat | 21 weld A |
| 4 handline | 22 weld B |
| 5 fishing line | 23 weld C |
| 6 planer | 24 arm A |
| 7 release mechanism | 25 arm B |
| 8 bait | 26 locking shaft |
| 9 harness | 27 Shaft receptor |
| 10 trip ring | 28 nonskid surface |
| 11 point A | 29 towing eye |
| 12 point B | 30 release teeth |
| 13 swivel | 31 arm teeth |
| 14 thimble | 32 jaws |
| 15 compression sleeve A | 33 release arm |
| 16 compression sleeve B | 34 compression pad A |
| 17 compression sleeve C | 35 compression pad B |
| 18 wire bail | |

DESCRIPTION OF THE PREFERRED EMBODIMENTS

Figure 1:
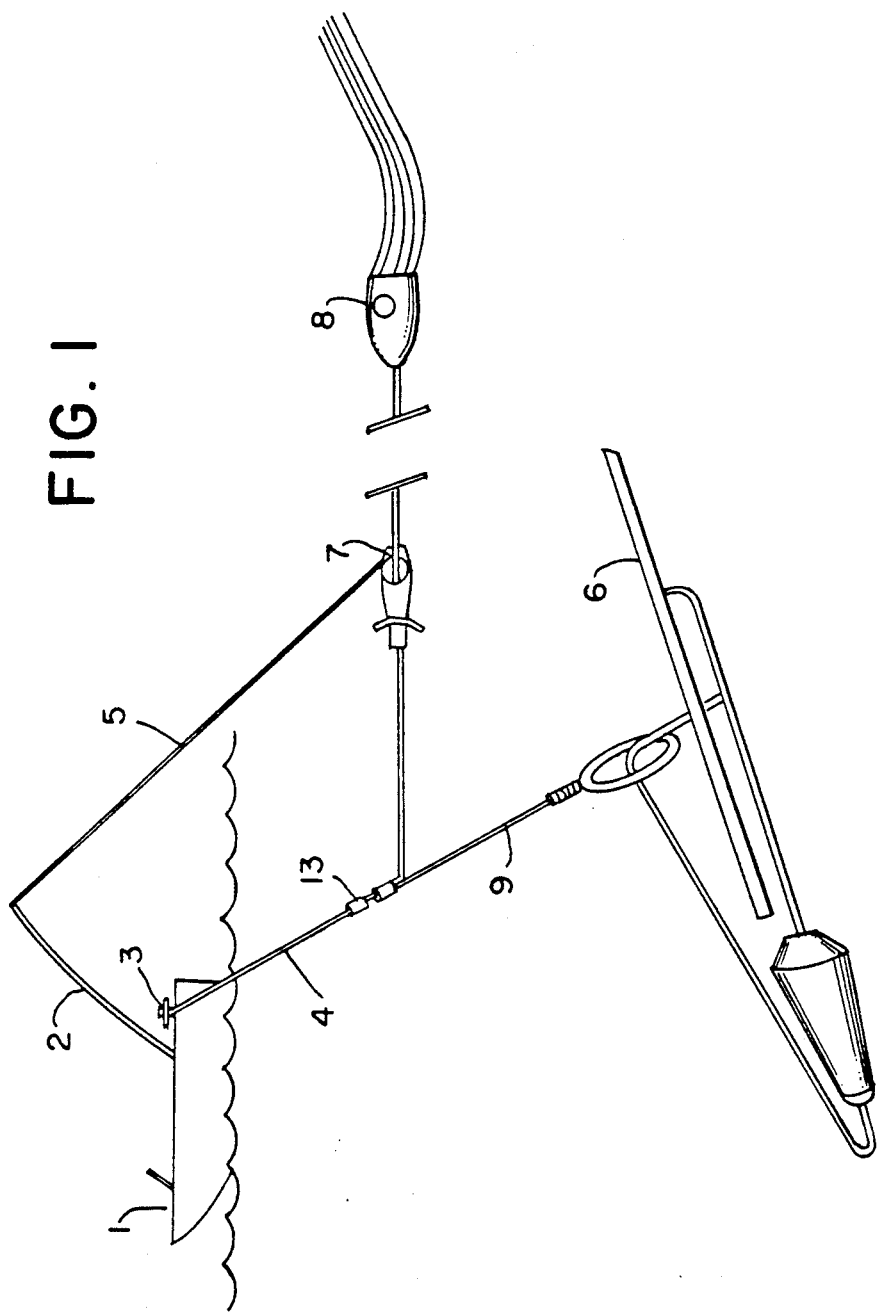
FIG. 1 shows an operational view of the invention while underway in a trolling mode.

FIG. 1 shows an operational view of the invention. A planar 6 is suspended by a harness 9 and swivel 13 are supported by a handline 4. The handline is attached to a cleat 3 or other secure object aboard a boat 1. A fishing rod 2 trails a fishing line 5 which interconnects and is held in position by a line release mechanism 7. A bait 8 trails behind said line release devise.

Figure 2:
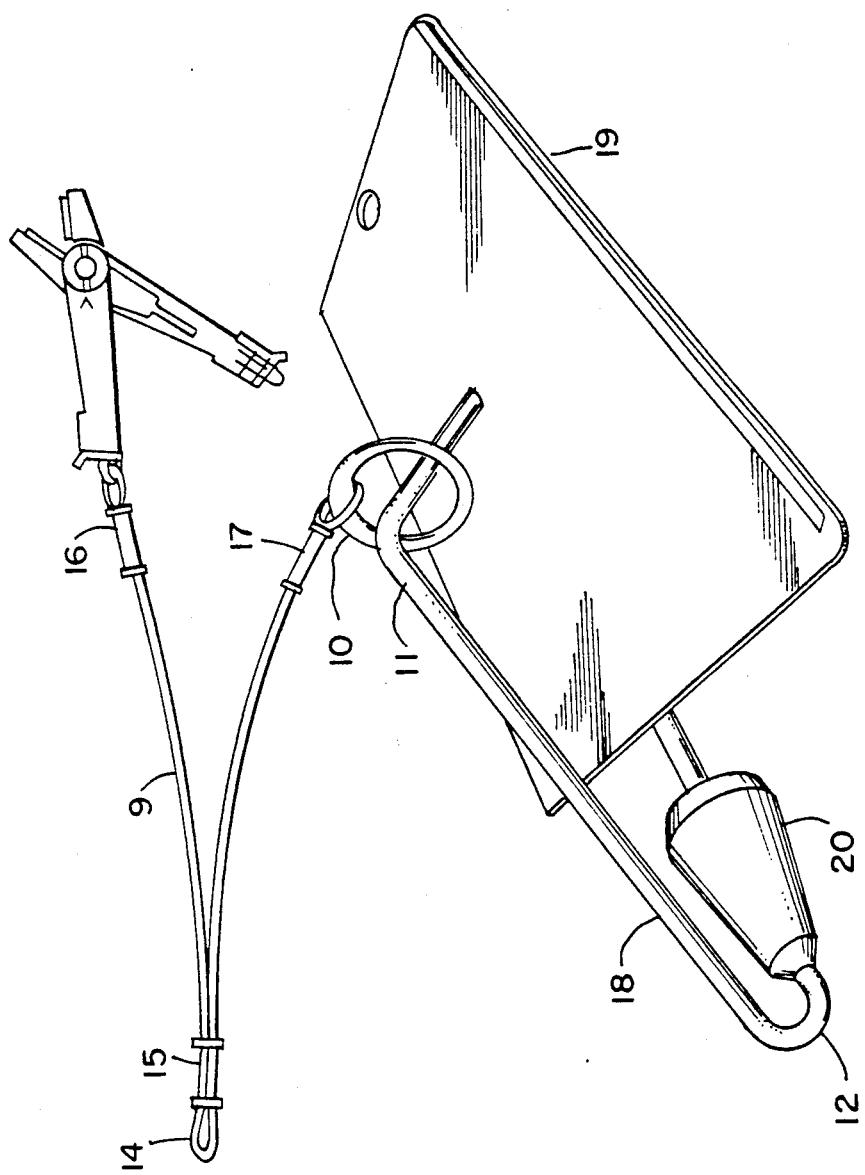
FIG. 2 shows an overhead perspective of the invention.

FIG. 2 shows an overhead perspective view of the invention. A thimble 14 is connected to a harness 9. Said harness ends are secured by compression sleeves 15 A, 16 B and 17 C. A trip ring 10 is mounted on a wire bail 18 and may move along a horizontal axis between point 11 and point 12. Said wire bail 18 is connected to a reactangular plate 19. A weight 20 is attached to said bail on a line with said plate, approximately ½ inch from point 12.

FIG. 3 shows a side view of the release mechanism. A set of parallel arms 24 and 25, constructed of plastic or similar functioning material, form a fulcrum joined at locking shaft 26 and shaft receptor 27, producing increased mechanical advantage at jaws 32. Compression pads 34 and 35, made of neoprene or similar functioning material, exert holding power on a fishing line. Arm teeth 31 and release teeth 30 interlock as said arms are pressed together into increasing parallel proximity. Release arm 33 disengages the jaws by lightly pulling said release arms away from the main body. Towing eye 29 provides a means to secure the line release devise to a harness. Nonskid surface 28 assists an angler in handling the line release devise.

FIG. 4 shows a side, top and perspective view of the line release mechanism. A set of parallel arms 24 and 25, constructed of nylon or similar functioning material, form a fulcrum joined at locking shaft 26 and shaft receptor 27, producing increased mechanical advantage at jaws 32. Compression pads 34 and 35, made of neoprene or similar functioning material, exert holding power on a fishing line. Arm teeth 31 and release teeth 30 interlock as said arms are pressed together into increasing parallel proximity. Release arm 33 disengages the jaws by lightly pulling said release arms away from the main body. Towing eye 29 provides a means to secure the line release device to a harness. Nonskid surface 28 assists an angler in handling the line release devise.

OPERATION OF THE INVENTION

One method in which an automatic line release devise and deep trolling planer may be used is illustrated in FIG. 1. A handline 4 is attached to a planer 6 and secured to a cleat 3. While a boat 1 is underway a rod 2 is placed in fishing position. A bait 8 is released and allowed to trail the boat by approximately 30 feet. A fishing line 5 is then secured to said planer using line release devise 7. The planer and line are released at the surface and allowed to dive. The handline and rod line play out until the handline becomes taut. The invention is now in fishing position. When a fish strikes, the rod line is pulled free from the line release devise, allowing the fisherman to play said fish unencumbered by the diving equipment. The planer may now be retrieved and reset for subsequent fish.

A compression type release devise as shown in FIG. 4 is the preferred release mechanism. This type release allows for variations in jaw pressure, controlled by the arm and release teeth setting, eliminates line chafe, operates during high speed trolling, is non corrosive and saltwater and sun resistant.

The reader will discover other uses such as a release devise on typical outrigger fishing rigs, kite fishing, standard flat lines and various downrigger fishing devises.

Thus the reader will see the invention provides a fisherman with increased line sensitivity, deeper fishing ability, improved capability to achieve proper initial diving angle when released in the water, eliminates the requirement for additional equipment or heavy tackle when deep trolling and utilizes a line release devise which performs at high speeds, eliminates line chafe, is non corrosive and resists the effects of saltwater and sunshine.

I claim:

1. A deep trolling device comprising a rectangular plate, a wire bail secured to a plate, a sliding ring stationed on said bail, with a weight positioned forward on the bail, the improvement comprising a line release devise which is positioned above the plate and bail and secured to said sliding ring with a harness, said release means consists of a fulcrum arrangement of two arms supported by a locking shaft focusing power on two compression discs, with a power adjustment at the opposite ends from said discs, increasing tension by placing said arms into parallel proximity and securing said position with interlocking teeth.

* * * * *